(12) United States Patent
Ha et al.

(10) Patent No.: US 8,828,476 B2
(45) Date of Patent: Sep. 9, 2014

(54) POLYIMIDE NANOCOMPOSITE AND METHOD FOR PREPARING SAME

(75) Inventors: Chang-Sik Ha, Pusan (KR); Myeon-Cheon Choi, Pusan (KR); Gwang-Yeon Kim, Jinju-si (KR)

(73) Assignee: Pusan National University Industry-University Cooperation Foundation (KR)

( * ) Notice: Subject to any disclaimer, the term of this patent is extended or adjusted under 35 U.S.C. 154(b) by 90 days.

(21) Appl. No.: 13/604,782

(22) Filed: Sep. 6, 2012

(65) Prior Publication Data

US 2012/0328785 A1 Dec. 27, 2012

Related U.S. Application Data

(63) Continuation of application No. PCT/KR2011/002272, filed on Apr. 1, 2011.

(30) Foreign Application Priority Data

Apr. 2, 2010 (KR) .................. 10-2010-0030269

(51) Int. Cl.
| | |
|---|---|
| *B05D 5/12* | (2006.01) |
| *C08K 3/04* | (2006.01) |
| *C08G 69/28* | (2006.01) |
| *C08L 79/08* | (2006.01) |
| *C08K 9/04* | (2006.01) |
| *C08J 5/00* | (2006.01) |
| *C08G 73/10* | (2006.01) |
| *B82Y 30/00* | (2011.01) |

(52) U.S. Cl.
CPC ............... *C08L 79/08* (2013.01); *C08J 5/005* (2013.01); *C08K 9/04* (2013.01); *C08G 73/10* (2013.01); *B82Y 30/00* (2013.01); *Y10S 977/932* (2013.01)
USPC ............. 427/58; 524/495; 524/538; 977/932

(58) Field of Classification Search
CPC .......... B82Y 30/00; C08K 9/04; C08L 79/08; C08L 79/085
USPC ................. 524/495, 538; 427/58; 977/93
See application file for complete search history.

(56) References Cited

U.S. PATENT DOCUMENTS

| | | | |
|---|---|---|---|
| 5,013,817 A | 5/1991 | Ohta et al. | |
| 6,762,237 B2 | 7/2004 | Glatkowski et al. | |
| 7,914,844 B2 * | 3/2011 | Stankovich et al. | ............ 427/58 |
| 8,110,026 B2 * | 2/2012 | Prud'Homme et al. | ............ 96/4 |
| 2009/0093581 A1 * | 4/2009 | Swei et al. | .................... 524/496 |
| 2011/0245378 A1 * | 10/2011 | Russ et al. | .................... 523/440 |
| 2012/0302683 A1 * | 11/2012 | Ku et al. | ....................... 524/186 |

FOREIGN PATENT DOCUMENTS

| | | |
|---|---|---|
| JP | 6-61597 A | 3/1994 |
| JP | 2004-339485 A | 12/2004 |
| KR | 91-008340 B1 | 10/1991 |

OTHER PUBLICATIONS

English Abstract of CN 102534858 A, Jul. 4, 2012, China.*
English Abstract of KR 1169206 B1, Aug. 2, 2012, Korea.*
Stankovich, S et al. Graphene-based composite materials, Nature Letters, 2006, vol. 442, pp. 282-286.
WIPO, International Search Report PCT/KR2011/002272, Dec. 22, 2011.

* cited by examiner

*Primary Examiner* — Tae H Yoon
(74) *Attorney, Agent, or Firm* — Park & Associates IP Law, P.C.

(57) ABSTRACT

Disclosed is a polyimide nanocomposite, which is prepared by mixing modified graphene oxide, polyamic acid, and a solvent to obtain a mixture solution, and heat-curing the mixture solution.

10 Claims, 4 Drawing Sheets

Just sonicated    After 1 hour    After 3 months

POLYIMIDE NANOCOMPOSITE AND METHOD FOR PREPARING SAME

REFERENCE TO RELATED APPLICATIONS

This is a continuation of pending International Patent Application PCT/KR2011/002272 filed on Apr. 1, 2011, which designates the United States and claims priority of Korean Patent Application No. 10-2010-0030269 filed on Apr. 2, 2010, the entire contents of which are incorporated herein by reference.

FIELD OF THE INVENTION

The present invention relates to a polyimide nanocomposite containing graphene oxide nanosheets or graphene nanosheets, and a method of preparing the polyimide nanocomposite.

BACKGROUND OF THE INVENTION

Recently, polymer nanocomposites have been in the spotlight as a novel material due to their excellent properties. Among polymer nanocomposites, a significant amount of research on graphene and carbon nanotubes based on carbon has been conducted. Since graphene and carbon nanotubes have excellent electrical, thermal, and mechanical properties, the application of these materials in a wide range of industrial fields, such as sensors, batteries, and hydrogen storage, may be expected.

According to previous research, it was verified that the uniform distribution and addition of graphene oxide sheets between polymer chains is an appropriate method of improving thermal and mechanical properties of polymers.

For example, in "Graphene-based composite materials" (Nature, 2006: 282-286), Sasha Stankovich described the preparation of a material having physical properties better than that of typical polystyrene by modifying graphene oxide obtained from graphite with phenyl isocyanate and dispersing the modified graphene oxide in a polystyrene polymer.

Meanwhile, polyimide resin from among polymer materials exhibits excellent heat resistance, chemical resistance, wear resistance, and weather resistance, based on the chemical stability of an imide chain, and in addition, exhibits a low thermal expansion coefficient, low air permeability, and excellent electrical properties. Thus, polyimide resins have been widely used in various industrial sectors, such as high temperature adhesives, engineering plastics, aerospace, microelectronics, and chemistry, by utilizing the widely applicable physical properties, and the application range thereof has been gradually increased as the development of monomers suitable for particular purposes and synthesis methods have been variously and accurately made. Recently, polyimide having a low dielectric constant and a high level of stability has attracted much interest in order to increase circuit speed and minimize stress between a support and a film in the electronics industry.

A polymer nanocomposite may be prepared by a method, in which nanosized particles are separated and dispersed in a polymer material and thus, physical properties of the polymer material are improved. Since impact resistance, tensile strength, and stiffness may be improved by dispersing and adding particles on a nano-scale to polymer materials, polymer nanocomposites are used as advanced composite materials.

SUMMARY OF THE INVENTION

An object of the present invention is to provide a polyimide nanocomposite having excellent thermal and mechanical properties.

Another object of the invention is to provide a method of preparing the nanocomposite.

To accomplish the above objects and advantages, there is provided a polyimide nanocomposite characterized in that modified graphene oxide and a polyamic acid are mixed with a solvent to form a mixed solution and the polyimide nanocomposite is formed by thermal curing of the mixed solution.

According to another aspect of the invention, there is provided a method of preparing a polyimide nanocomposite including: mixing modified graphene oxide, a polyamic acid, and a solvent to prepare a mixed solution; coating an object with the mixed solution; and thermally curing the coated mixed solution.

The modified graphene oxide may be prepared by modifying top and bottom surfaces of plate-shaped graphene oxide with a material including amine and having a negative charge.

In particular, the graphene oxide may be prepared by oxidizing graphite using a strong acid and a strong oxidant.

The material having a negative charge may include an organic material, such as —COOH and —$SO_3H$ groups, releasing hydrogen to have a negative charge.

The solvent may include dipolar aprotic amide solvents, such as N,N-dimethylacetamide (DMAC), N,N-dimethylformamide (DMF), N-methylpyrrolidone (NMP), tetramethylurea (TMU), and dimethylsulfoxide (DMSO).

The polyimide may include fully aromatic polyimides, fully aliphatic polyimides, and semi-aromatic polyimides.

In order to prepare the mixed solution, the modified graphene oxide may be mixed in a pre-synthesized polyamic acid or a polyamic acid may be mixed in a solvent having the modified graphene oxide dispersed therein.

According to the foregoing configuration, a film or coating material having excellent durability and excellent thermal and mechanical properties may be prepared.

DETAILED DESCRIPTION OF THE INVENTION

Hereinafter, an embodiment of the present invention will be described in detail with reference to the accompanying drawings.

In the present invention, a polyimide nanocomposite is prepared by dispersing graphene oxide simultaneously having high strength and high heat resistance on a nano-scale and mixing the graphene oxide with polyimide, and the polyimide nanocomposite is used as a film or coating material having excellent durability and excellent thermal and mechanical properties.

In the present invention, graphene oxide is used for improving thermal and mechanical properties, and a method of uniformly distributing graphene sheets in a polyimide resin is suggested.

Graphene is denoted as a single layer separated and peeled off from graphite, and graphene oxide is denoted as plate-shaped nanoparticles prepared by synthesizing through chemical oxidation of graphite powder.

Graphene oxide may be prepared by oxidizing graphite using strong acid and strong oxidant.

With respect to graphene oxide, a side portion of the plate includes a plurality of epoxy groups, alcohol groups, or carbonyl groups, and an end portion of the plate is formed of carboxyl groups.

Therefore, graphene oxide forms a plate-shaped structure having irregular and various shapes in comparison to graphene while the graphene has a stable plate-shaped structure. Also, with respect to graphene oxide, since the distance between the plates is maintained to be greater than that of graphene by the foregoing epoxy groups, alcohol groups, or carbonyl groups to thus facilitate the penetration of solvent and other organics, the compatibility with solvents and polymer materials may be improved.

In particular, since the foregoing alcohol groups and carboxyl groups have hydrophilicities, these groups exhibit excellent dispersibilities with respect to water or a polar solvent in comparison to graphene without having such functional groups.

Although graphene oxide having a plate-shaped structure exhibits dispersibility in a solvent for a certain period of time, graphene oxide may also exhibit an agglomeration phenomenon due to interaction and gradual sedimentation characteristics over a prolonged period of time.

Figure 1:
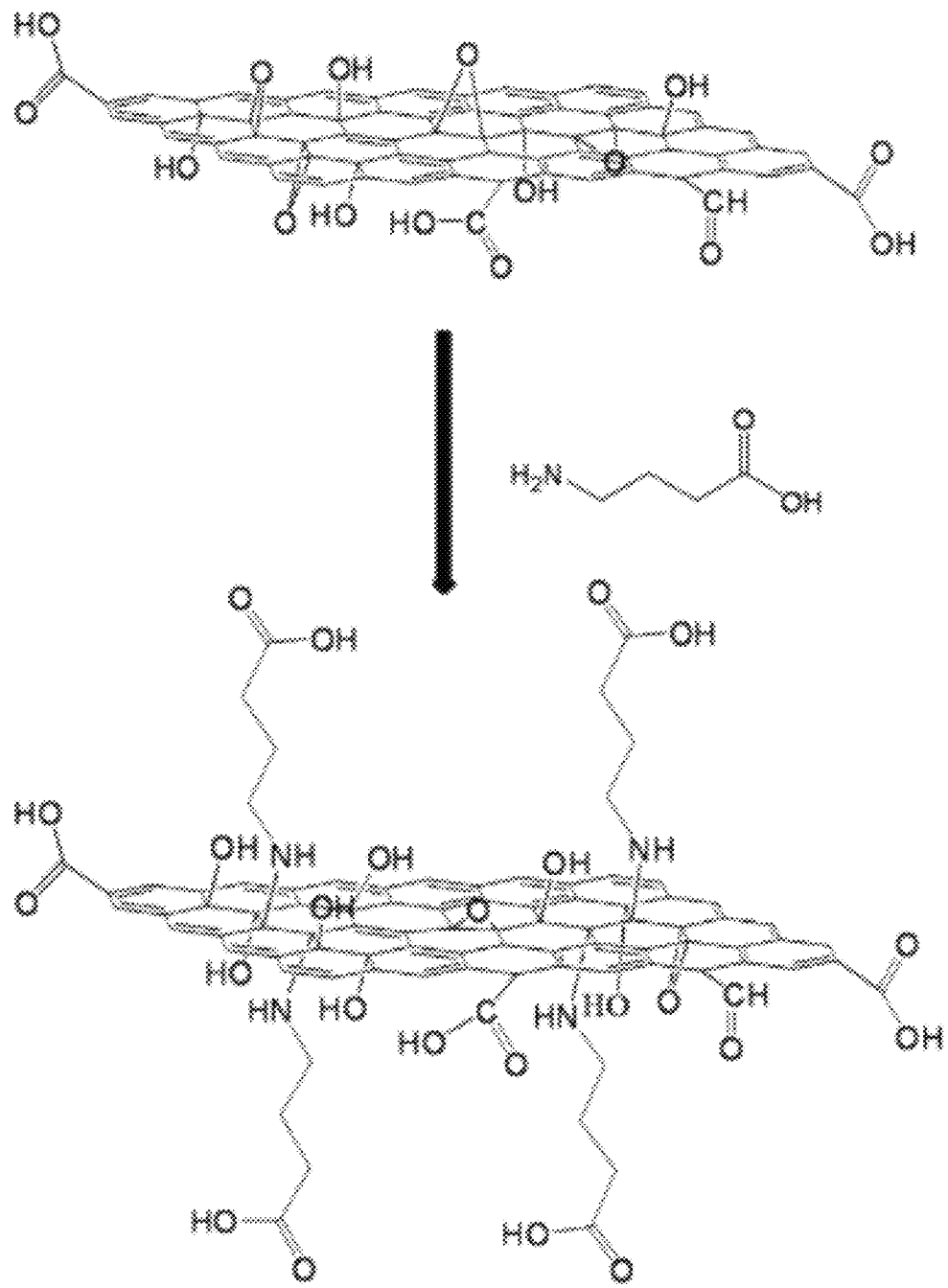
FIG. 1 illustrates a modification process of graphene oxide.

Therefore, in order to improve dispersibility by inhibiting the agglomeration phenomenon due to the plate-shaped structure, graphene oxide is modified by introducing an organic material covalent bonded to the side portion of the plate, as shown in FIG. 1 in the present invention, and thus, the distance between the plates is increased and also, the interaction between the plate-shaped structures is inhibited.

Referring to FIG. 1, dispersibilty may be improved by interacting an amide-based solvent, such as dimethylacetamide (DMAC) that is mainly used as a solvent for polyimide synthesis, with an organic material including amine, such as a gamma-aminobutyric acid that is able to form covalent bonds with an epoxy group existing on the plate in order to modify graphene oxide having a plate-shaped structure and also having a functional group, such as —COOH and —$SO_3H$, capable of having a negative charge by releasing hydrogen, and since a polyimide precursor has a similar structure to —COOH distributed in a large amount in a polyamic acid, dispersibilty with respect to a polyamic acid, a polymer, as well as a solvent is greatly improved.

A solution including modified graphene oxide sheets is dispersed in a polyamic acid on a nano-scale, and a heat treatment is then performed on the solution to convert the polyamic acid into polyimide and simultaneously, thermally reduce the modified graphene oxide into graphene. Finally, graphene is well dispersed in a polyimide resin to prepare a polyimide nanocomposite having excellent thermal and mechanical properties.

With respect to the polyimide nanocomposite prepared according to the present invention, its thermal and mechanical properties are more improved than those of pure polyimide.

The prepared polyimide nanocomposite may include graphene or graphene oxide in an amount ranging from 0.5% to 20% and for example, may include 0.5% to 5%.

Also, the polyimide may include fully aromatic polyimides, fully aliphatic polyimides, and semi-aromatic polyimides.

In order to prepare the foregoing polyimide nanocomposite, a mixed solution of solvent, polyamic acid, and modified graphene oxide is prepared, and the mixed solution is then thermally cured. A method of preparing a mixed solution of a pre-synthesized polyamic acid and modified graphene oxide may include a method of mixing the modified graphene oxide in the pre-synthesized polyamic acid and a method of synthesizing a polyamic acid in a solvent having the modified graphene oxide dispersed therein.

Herein, the solvent may include dipolar aprotic amide solvents, such as N,N-dimethylacetamide (DMAC), N,N-dimethylformamide (DMF), N-methylpyrrolidone (NMP), tetramethylurea (TMU), and dimethylsulfoxide (DMSO).

The modified graphene oxide may be prepared by introducing a material having a large amount of negative charge on top and bottom surfaces of the plate-shaped graphene oxide sheet.

Herein, the material having a negative charge includes an organic material capable of having a negative charge by releasing hydrogen (H), such as —COOH and —$SO_3H$ groups, and may be a material having a —COOH group.

Embodiment

Preparation of Polyimide Nanocomposite Containing Graphene

Graphene oxide prepared according to Hummer's method was modified with a gamma-aminobutyric acid. As described above, graphene oxide was well-dispersed in dimethylacetamide, a solvent for a polyamic acid, through modification.

Subsequently, the modified graphene oxide and a polyamic acid were mixed at mixing ratios of Table 1. Compositions of samples prepared according to wt % of the modified graphene oxide are presented in Table 1. The mixed mixtures were stirred at room temperature for 6 hours and glass substrates were then coated with the mixtures. Thereafter, the coated glass substrates were heat treated at 80° C. for 2 hours, at 140° C. for 1 hour, at 200° C. for 1 hour, at 250° C. for 30 minutes, and at 300° C. for 1 hour in a nitrogen atmosphere.

TABLE 1

| Modified graphene oxide (g) | Polyamic acid (g) | Dimethylacetamide (g) |
|---|---|---|
| 0.003 | 0.3 | 2.7 |
| 0.006 | 0.3 | 2.7 |
| 0.009 | 0.3 | 2.7 |
| 0.012 | 0.3 | 2.7 |

Comparative Example

A glass substrate was coated with a polyamic acid excluding the graphene oxide modified in the embodiment and then heat treated at 80° C. for 2 hours, at 140° C. for 1 hour, at 200° C. for 1 hour, at 250° C. for 30 minutes, and at 300° C. for 1 hour in a nitrogen atmosphere.

Description of Results

Figure 2:
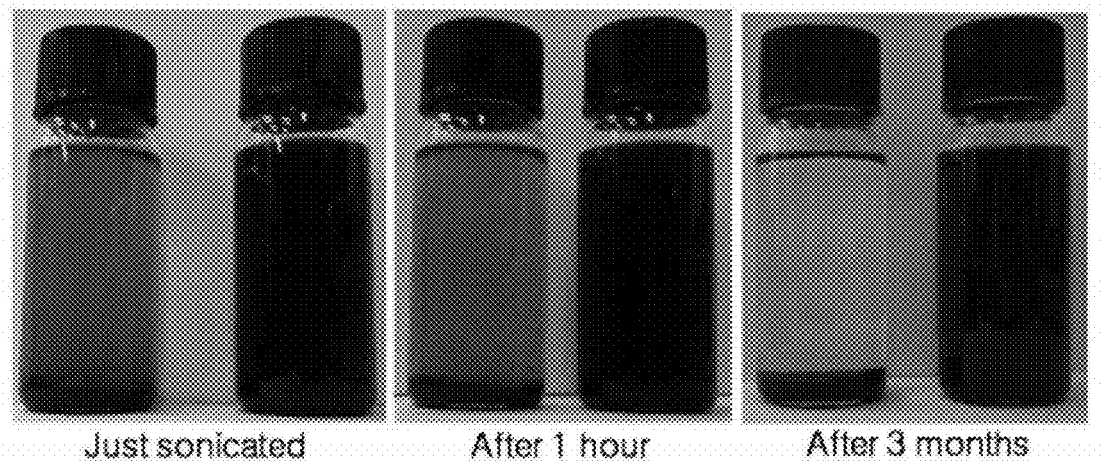
FIG. 2 illustrates degrees of dispersions of graphene oxide and modified graphene oxide according to a solvent.

FIG. 2 illustrates degrees of dispersions of graphene oxide and modified graphene oxide according to a solvent.

As a result of dispersions of graphene oxide and modified graphene oxide in dimethylacetamide, a solvent used for synthesis of polyimide, it may be understood that after 3 months, the modified graphene oxide was well dispersed in a colloidal form while sedimentation occurred for all the unmodified graphene oxide.

Figure 3:
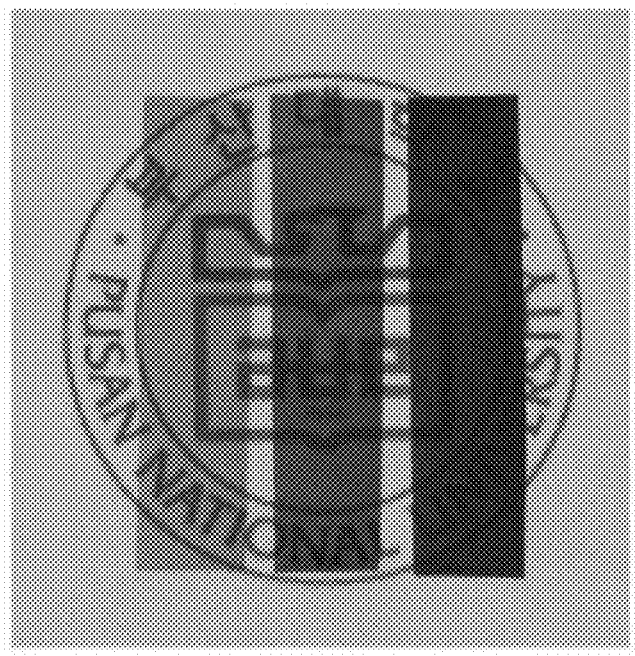
FIG. 3 illustrates polyimide films obtained by mixing modified graphene oxide with a polyamic acid at weight ratios of 0%, 1%, and 2% according to the content of the modified graphene oxide.

FIG. 3 illustrates polyimide films obtained by mixing the modified graphene oxide with a polyamic acid at weight ratios of 0%, 1%, and 2% according to the content of the modified graphene oxide.

As shown in FIG. 3, it may be understood that the color of the film changed to the inherent color of graphene, and particles in the film did not appear and were uniformly mixed as the content of the modified graphene oxide increased.

Figure 4:
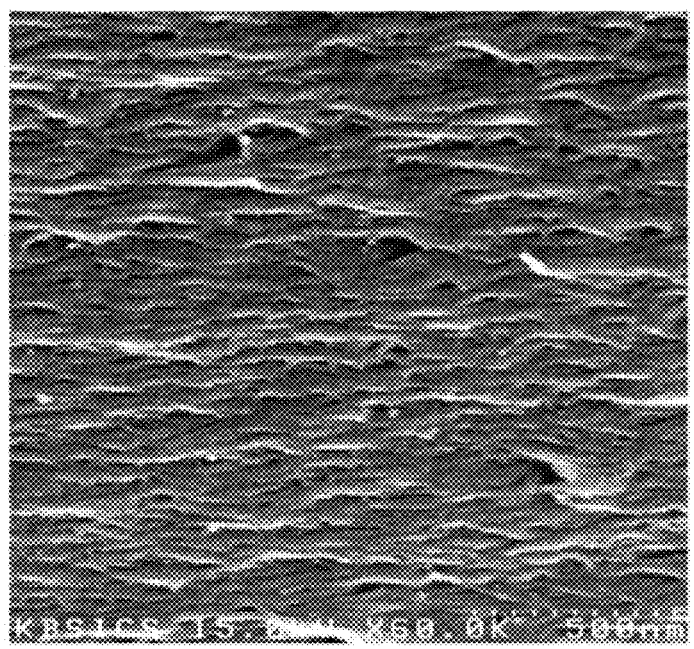
FIG. 4 illustrates an electron micrograph of a cross section of a polyimide film including modified graphene oxide.

FIG. 4 illustrates an electron micrograph of a cross section of a polyimide film including modified graphene oxide.

As shown in FIG. 4, it may be understood that graphene sheets were very uniformly arranged on top of each other and dispersed in the cross section of the polyimide film.

Figure 5:
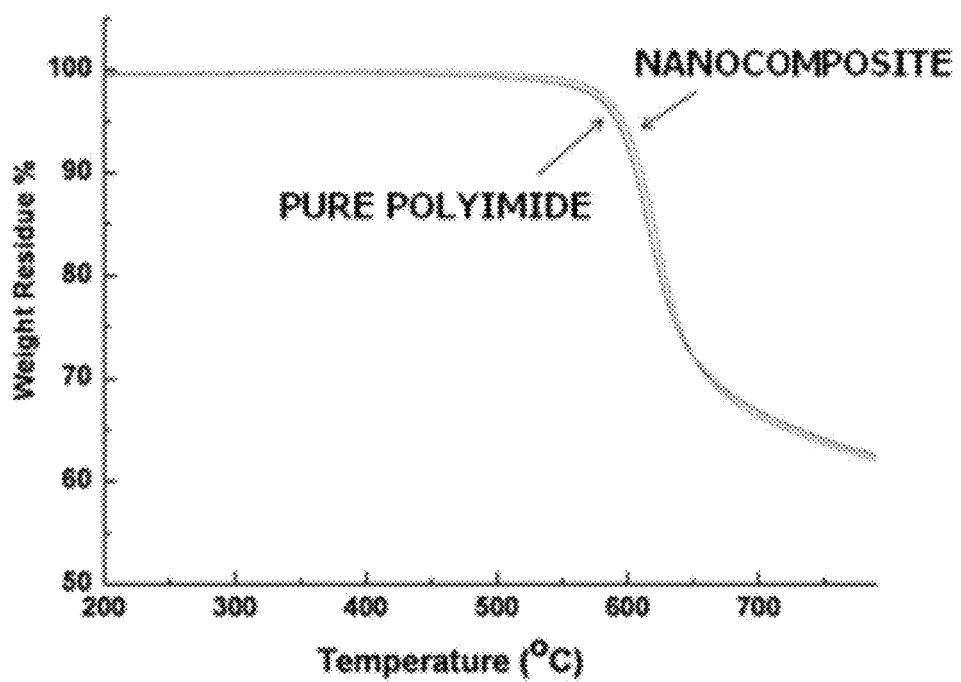
FIG. 5 illustrates a thermogravimetric analysis curve of a nanocomposite.

FIG. 5 illustrates a thermogravimetric analysis curve of a nanocomposite.

Herein, a nanocomposite film having a content of the typically modified graphene oxide at a weight ratio of 1% was used. The temperature was 559° C. when the weight of a pure polyimide film was decreased by 2% from the initial weight thereof. However, the temperature was increased to 575° C. according to the addition of the modified graphene oxide. This indicated that thermal stability was improved due to modified graphene in the nanocomposite. Therefore, it may be understood that the uniformly dispersed graphene sheets inhibited the deterioration of polyimide.

Figure 6:
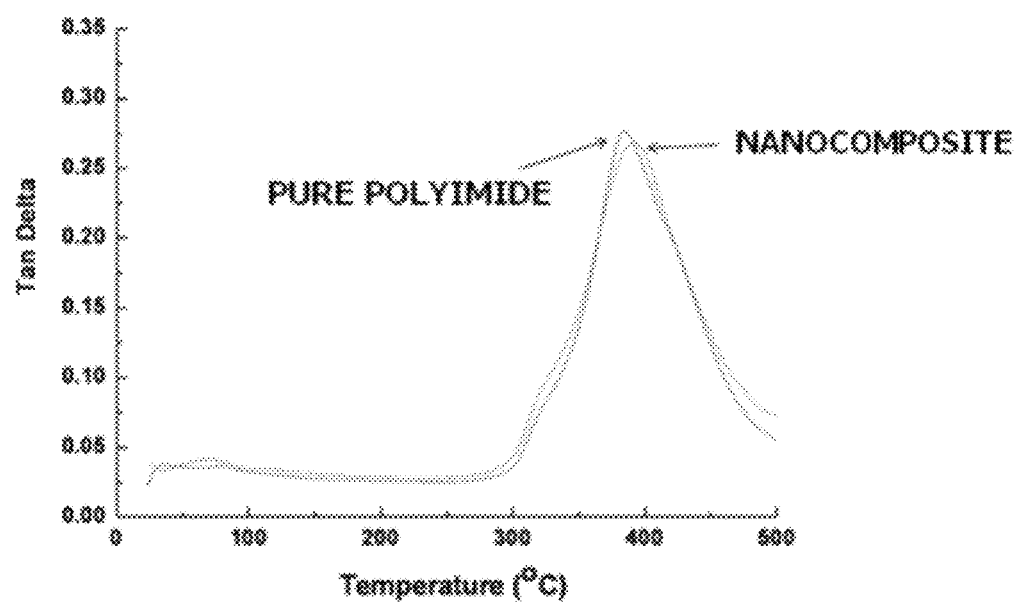
FIG. 6 illustrates a dynamic mechanical analysis curve of a nanocomposite.

FIG. 6 illustrates a dynamic mechanical analysis curve of a nanocomposite.

Dynamic mechanical analysis curves of the nanocomposite film having a content of the typically modified graphene oxide at a weight ratio of 1% and the pure polyimide film are shown in FIG. 6. Glass transition temperatures of the pure polyimide film and the nanocomposite were 384.83° C. and 392.45° C., respectively. This indicated that dynamic mechanical properties improved as the modified graphene oxide was mixed in the pure polyimide. It may be understood that this was due to the interaction between the graphene sheets and polyimide chains. Also, it was identified that the peak of the curve was broadened, which indicated that the fluidity of the chain was inhibited due to the graphene sheets as temperature increased.

Table 2 is the result of an analysis on the tensile modulus of the nanocomposite according to the content of graphene oxide. The tensile modulus increased up to 40% as the content of the modified graphene oxide increased up to about 2%. This indicated that strength of the nanocomposite increased as the graphene sheets were uniformly dispersed in the polyimide.

Table 2 is the result of an analysis on the tensile modulus of the nanocomposite according to the content of graphene oxide. The tensile modulus increased up to 40% as the content of the modified graphene oxide increased up to about 2%. This indicated that strength of the nanocomposite increased as the graphene sheets were uniformly dispersed in the polyimide.

TABLE 2

| Weight (%) of modified graphene oxide with respect to polyamic acid | Tensile modulus (MPa) |
|---|---|
| 0.0 | 1239 |
| 0.5 | 1331 |
| 1.0 | 1365 |
| 1.5 | 1456 |
| 2.0 | 1577 |
| 2.5 | 1798 |

While the present invention has been described in detail, it should be understood that various changes, substitutions and alterations can be made hereto without departing from the spirit and scope of the invention as defined by the appended claims.

INDUSTRIAL APPLICABILITY

Since nanocomposites have excellent electrical, thermal, and mechanical properties, the application of the nanocomposites in a wide range of industrial fields, such as sensors, batteries, or hydrogen storage, may be expected.

What is claimed is:

1. A polyimide nanocomposite, characterized in that modified graphene oxide and a polyamic acid are mixed with a solvent to form a mixed solution, and the polyimide nanocomposite is formed by thermal curing of the mixed solution, wherein the modified graphene oxide is prepared by modifying top and bottom surfaces of plate-shaped graphene oxide with a material comprising amine and having a negative charge.

2. The polyimide nanocomposite of claim 1, wherein the graphene oxide is prepared by oxidizing graphite using a strong acid and a strong oxidant.

3. The polyimide nanocomposite of claim 1, wherein the material having a negative charge comprises an organic material including a —COOH or —SO$_3$H group releasing hydrogen to have a negative charge.

4. The polyimide nanocomposite of claim 1, wherein the solvent comprises dipolar aprotic amide solvents including DMAC (N,N-dimethylacetamide), DMF (N,N-dimethylformamide), NMP (N-methylpyrrolidone), TMU (tetramethylurea), and DMSO (dimethylsulfoxide).

5. The polyimide nanocomposite of claim 1, wherein the polyimide comprises fully aromatic polyimides, fully aliphatic polyimides, and semi-aromatic polyimides.

6. A method of preparing a polyimide nanocomposite, the method comprising:
    mixing modified graphene oxide, a polyamic acid, and a solvent to prepare a mixed solution;
    coating an object with the mixed solution; and
    thermally curing the coated mixed solution,
    wherein the modified graphene oxide is prepared by modifying top and bottom surfaces of plate-shaped graphene oxide with a material comprising amine and having a negative charge.

7. The method of claim 6, wherein the material having a negative charge comprises an organic material including a —COOH or —SO$_3$H group releasing hydrogen to have a negative charge.

8. The method of claim 6, wherein the solvent comprises dipolar aprotic amide solvents including DMAC (N,N-dimethylacetamide), DMF (N,N-dimethylformamide), NMP (N-methylpyrrolidone), TMU (tetramethylurea), and DMSO (dimethylsulfoxide).

9. The method of claim 6, wherein the polyimide comprises fully aromatic polyimides, fully aliphatic polyimides, and semi-aromatic polyimides.

10. The method of claim 6, wherein to prepare the mixed solution, the modified graphene oxide is mixed in a pre-synthesized polyamic acid or a polyamic acid is mixed in a solvent having the modified graphene oxide dispersed therein.

* * * * *